United States Patent [19]
Orlando et al.

[11] 4,286,426
[45] Sep. 1, 1981

[54] VIBRATORY FRUIT HARVESTER

[75] Inventors: Franklin P. Orlando, Morgan Hill; Richard W. Fitzmaurice, Santa Clara, both of Calif.

[73] Assignee: FMC Corporation, San Jose, Calif.

[21] Appl. No.: 95,822

[22] Filed: Nov. 19, 1979

[51] Int. Cl.³ .................... A01D 46/26; A01D 46/28
[52] U.S. Cl. .................................. 56/330; 56/328 TS
[58] Field of Search .......................... 56/330, 328 TS

[56] References Cited

U.S. PATENT DOCUMENTS

| | | | |
|---|---|---|---|
| 3,184,908 | 5/1965 | Rust | 56/330 |
| 3,187,493 | 6/1965 | Harrett | 56/330 |
| 3,229,453 | 1/1966 | Harrett | 56/330 |
| 3,344,591 | 10/1967 | Christie et al. | 56/330 |
| 3,396,521 | 8/1968 | McKibben et al. | 56/330 |
| 3,413,789 | 12/1968 | Studer | 56/330 |
| 3,439,478 | 4/1969 | Orton | 56/330 |
| 3,439,482 | 4/1969 | Orton | 56/330 |
| 3,485,027 | 12/1969 | Ganger | 56/330 |
| 3,492,801 | 2/1970 | Olmo et al. | 56/330 |
| 3,535,856 | 10/1970 | Olmo et al. | 56/330 |
| 3,611,689 | 10/1971 | Patzlaff | 56/330 |
| 3,636,688 | 1/1972 | Fontan et al. | 56/330 |
| 3,703,072 | 11/1972 | Patzlaff | 56/330 |
| 4,016,711 | 4/1977 | Claxton | 56/330 |
| 4,063,406 | 12/1977 | Burton | 56/330 |
| 4,085,572 | 4/1978 | Bruel | 56/330 |
| 4,170,100 | 10/1979 | Hood, Jr. et al. | 56/328 TS |
| 4,172,352 | 10/1979 | McCarthy et al. | 56/330 |
| 4,179,871 | 12/1979 | Claxton | 56/330 |
| 4,207,727 | 6/1980 | Poytress | 56/330 |

FOREIGN PATENT DOCUMENTS

| | | | |
|---|---|---|---|
| 2403734 | 5/1979 | France | 56/330 |
| 2419004 | 11/1979 | France | 56/330 |

*Primary Examiner*—Paul J. Hirsch
*Attorney, Agent, or Firm*—R. S. Kelly

[57] ABSTRACT

A harvesting apparatus for plants grown in rows, such as grapes, includes a vehicle having a support frame of an inverted U-shape and a shaker frame that also has an inverted U-shape and that is pivotally mounted to the vehicle support frame about a single axis that is parallel to the direction of travel of the vehicle. Striker bars are rigidly attached in spaced, opposing and parallel relation at the lower end of the shaker frame and at a height above ground level to engage the trunk of the plants. A non-positive oscillatory drive mechanism is attached to the upper end of the shaker frame to rock the frame about the single pivot axis to cause the striker bars to alternately impact opposite sides of the trunks. The drive mechanism consists of two eccentric weights rotatably mounted to the shaker frame above and equidistantly spaced from the pivot axis so that the center of gravity of the shaker frame, weights and other elements attached to the shaker frame is approximately coincidental with the pivot axis. The shaker frame includes frame sections adapted to scissor about the pivot axis so that the distance between the striker bars is greater than the diameters of the trunks to permit continuous harvesting, and a grape collection and conveyance system is also provided on the vehicle below the shaker frame.

23 Claims, 6 Drawing Figures

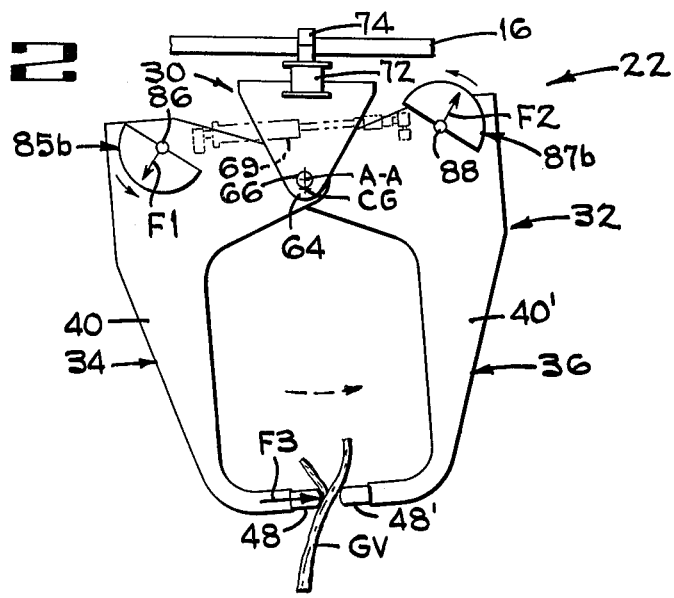
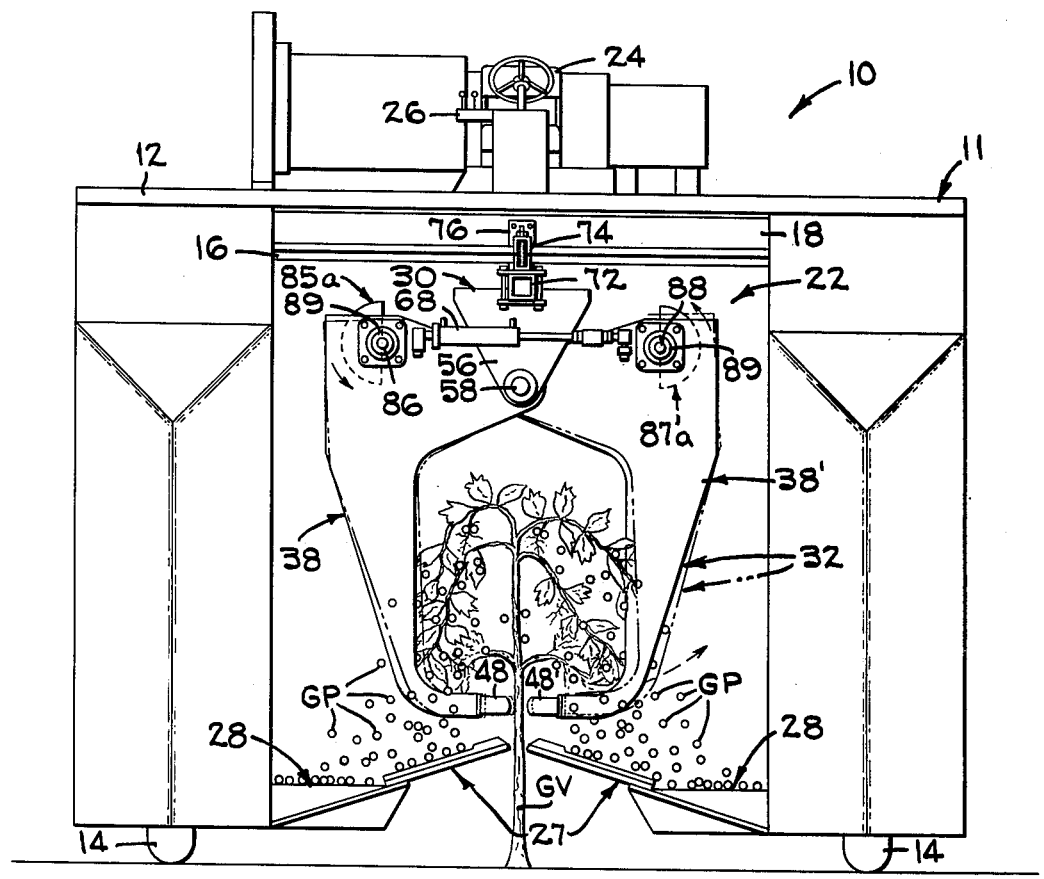

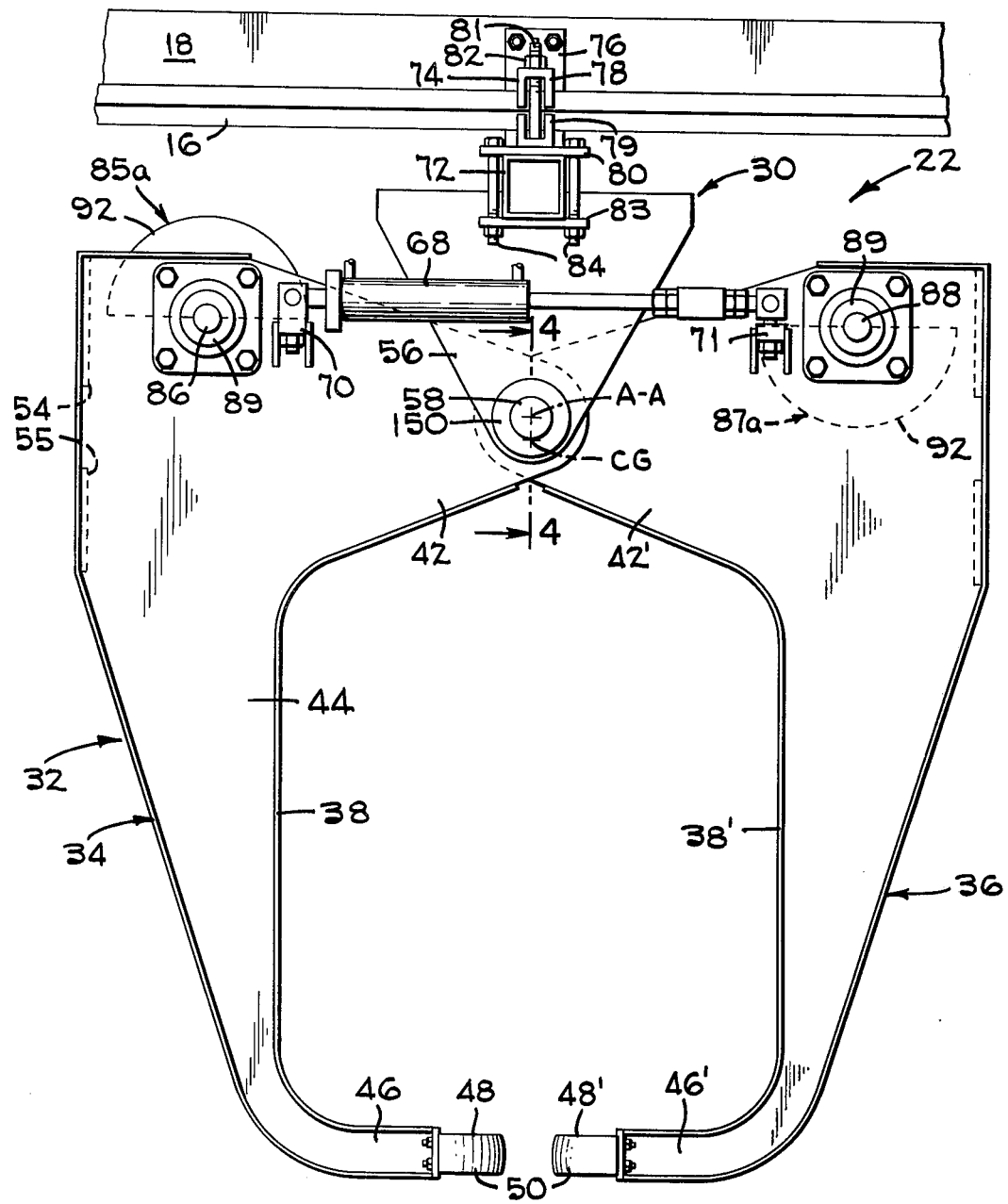
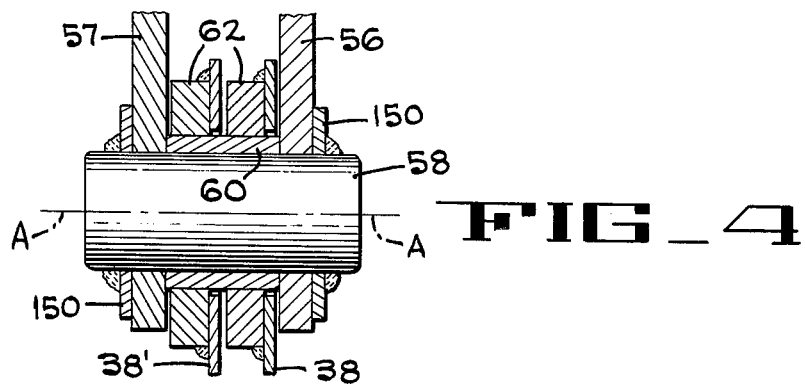

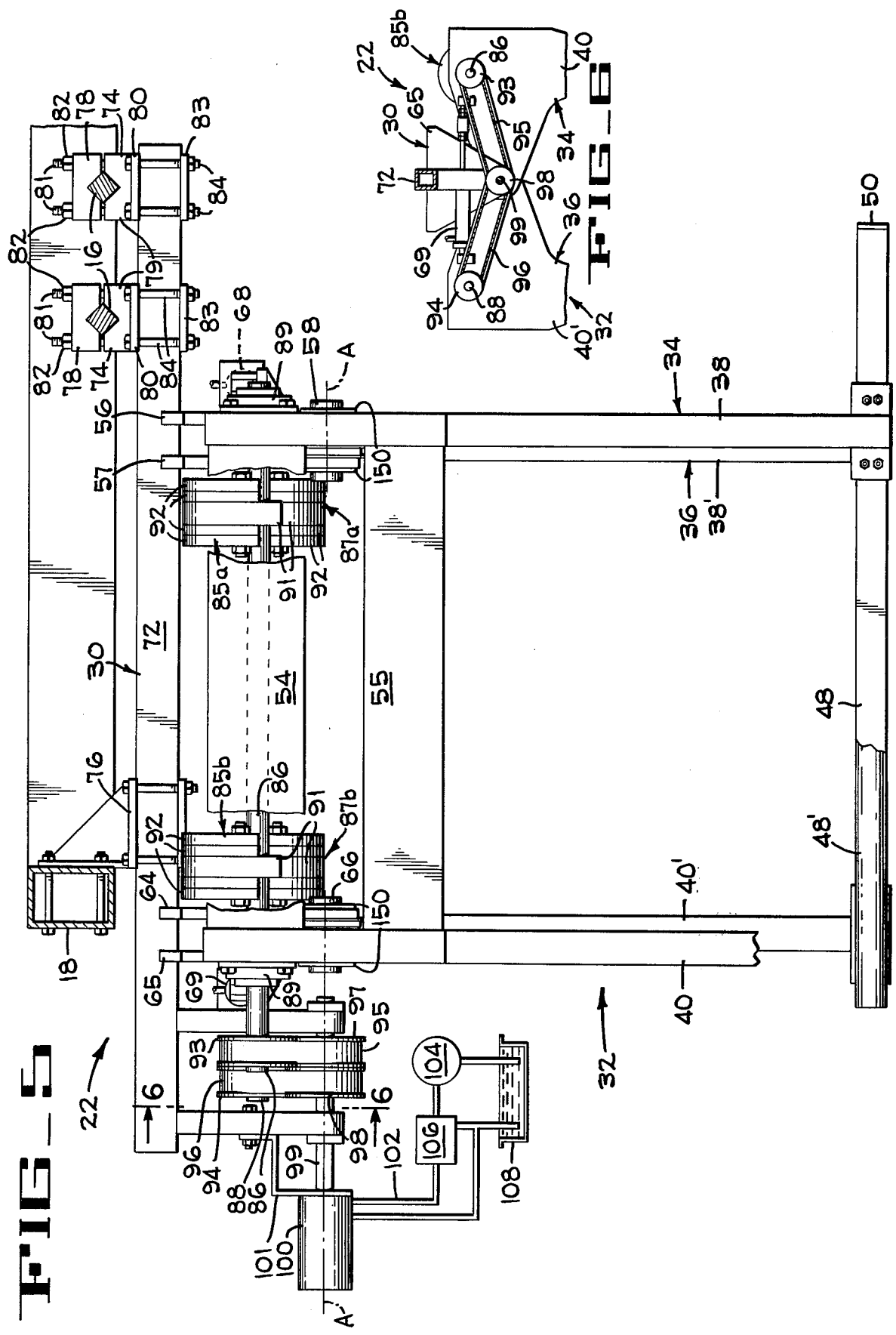

VIBRATORY FRUIT HARVESTER

BACKGROUND OF THE INVENTION

1. Field of the Invention

The present invention generally relates to apparatus for harvesting fruits or nuts from plants, and more particularly, the present invention relates to a harvesting apparatus that is adapted to transmit shaking forces to the trunk of the plant to be harvested.

2. Description of the Prior Art

One type of vibratory harvester particularly suited to harvest berries from vines or bushes grown in rows includes a shaker mechanism having fingers or arms adapted to penetrate the branches of the vines or bushes and to vibrate the branches to dislodge berries therefrom. Examples of this type of harvester are disclosed in the following U.S. Pat. Nos.: 3,184,908 issued to D. Rust on May 25, 1965; 3,396,521 issued to H. McKibben et al on Aug. 13, 1968; and 3,485,027 issued to R. Ganger on Dec. 23, 1969. The major problem with the vibratory finger type of harvester is that the fingers crush some of the berries during the harvesting process. Thus, some of the berries are damaged and some juice is expressed from the berries during harvesting thereby adversely affecting both the quality and quantity of the berry harvest. Also, the excessive amount of juice expressed during harvesting can unduly contaminate the shaker assembly and the berry collection system of the harvester.

U.S. Pat. No. 3,344,591 to Christie et al discloses a vibratory finger type of berry harvester that includes a shaker mechanism comprising a pair of vertical, transversely spaced shaker rotors that have fingers adapted to penetrate the branches of the vines or bushes. The rotors are positively driven to cause the rotors to oscillate and to rotate generally forwardly at a speed proportional to the speed of the vehicle. As disclosed in the patent, each rotor is driven by a sun gear oscillated about a given position through the action of a crank mechanism driven by an eccentric drive unit. Although this type of harvester is generally satisfactory in terms of dislodging a high percentage of the ripe berries from bushes or vines, it is subject to the same problems mentioned above in connection with other types of finger type shaker mechanisms; that is to say, too many of the berries are crushed by the fingers thereby ruining the quality and quantity of the berry output and unduly contaminating the shaker assembly and collection system of the harvester. Also, the sun gear and eccentric crank drive units are relatively expensive to manufacture and difficult to maintain.

U.S. Pat. No. 3,413,789 to Studer also discloses a vibratory finger type of fruit harvester adapted to harvest fruits and nuts from trees, bushes, and the like. The Studer patent discloses a vehicle-mounted shaker assembly that includes a rotor comprising a single row of radially extending arms, and the rotor is mounted for rotation about a vertical axis such that the arms extend laterally into the branches of the tree. The rotor is free to rotate so that the arms move in direct relationship to the forward speed of the vehicle as they are engaged by the trees or bushes, and eccentric weight vibration producing mechanisms are directly secured to the rotor. In one embodiment described in the Studer patent, two eccentric weights are mounted on the rotor and are positively driven in a relationship such that the weights always rotate 180° out of phase with each other. The angular positional relationship of the weights and their equidistant spacing from the rotor axis is such that the forces induced by the weights combine additively to oscillate the rotor about its axis of rotation while inducing minimal vibration loading forces on the rotor support. The main objective of the invention of the Studer patent is stated therein to be the provision of a rotor type of shaker assembly that developes a circumferential vibration in the rotor which has no appreciable directional component (such as would tend to shake the harvester vehicle or rotor support so severely as to produce crystallization of the metal parts therein).

Another type of berry harvester includes parallel bars adapted to tightly grip the trunk of the plant while oscillating laterally to shake the fruit therefrom. Paddles are also used to rotate against the limbs and foliage to disrupt the vibrations induced by the gripping bars on the foliage to further aid in dislodging the fruit. Examples of this type of harvester are disclosed in U.S. Pat. No. 3,187,493 issued to E. Harrett on June 8, 1965 and U.S. Pat. No. 3,229,453 issued to E. Harrett on Jan. 18, 1966.

Another vibratory harvester particularly designed to continuously harvest grape vines includes an arrangement of parallel ski-shaped bars adapted to be oscillated laterally to strike the trunks of grape vines. An example of such type of harvester is the Pulsator model harvester manufactured by Up-Right Harvesters of Selma, Calif. Such grape harvester includes a shaker assembly that is pivotally mounted to an elevated portion of the frame of the harvester vehicle that overlies the vines. The shaker assembly includes the pair of ski-shaped striker bars that are adapted to slide and impact against opposite sides of the trunks of the vines during harvesting with only one of the striker bars engaging a trunk at a time. The striker bars are swingingly mounted at each side of the shaker assembly upon four-bar linkages, and the bars are driven by eccentric crank units to cause bars to laterally oscillate as the harvester is moved down a row of vines. The bars are oscillated in timed relation by right angle drive linkages connected between the eccentric crank units.

SUMMARY OF THE INVENTION

According to the present invention, the harvester includes a shaker assembly that is pivotally mounted to the frame of a vehicle for rotation about an horizontal axis that extends generally parallel to the path of travel of the vehicle. The shaker assembly includes a substantially rigid frame embodying at least one arm extending downwardly from the pivot axis on the frame, and a striker member is attached to the lower end of the arm at a height adapted to impact the trunk of a plant to be shaken. The shaker assembly further includes a vibration producing mechanism that is attached to the shaker frame. The vibration producing mechanism is adapted to cause the frame to pivot back and forth about the pivot axis to cause the striker member to repeatedly impact the trunk of the plant with a selected frequency.

Preferably, the vibration producing mechanism includes a pair of eccentric weights that are rotatably mounted in a transversely spaced relationship to the shaker frame for rotation about axes that are parallel to the axis of rotation of the shaker frame. The eccentric weights are driven at a selected speed and at a predetermined phase relationship to each other to cause the frame to oscillate at a frequency adapted to most efficiently dislodge fruits from the plants.

In a preferred embodiment, the harvester includes a shaker assembly comprising a shaker frame that includes two frame sections, or arms, that are scissorably and adjustably secured together so they form, in effect, a rigid frame during harvesting. The striker members are rigidly attached to the lower ends of the arms to oppose each other, and the shaker frame is suspended from the frame of the vehicle over the plants to be harvested so that the frame may pivot from side to side about an axis that extends longitudinally of the vehicle above the plants with the striker members alternately impacting opposite sides of the trunks of the plants. The arms have opposing configurations that permit the portions of the plants above the striker members to move between the arms as the harvester is driven over the plants.

BRIEF DESCRIPTION OF THE DRAWINGS

FIG. 1 is a front end elevation of a grape harvester constructed according to the present invention with an alternate position of the shaker frame after it has swung in one direction being shown in phantom lines.

FIG. 2 is a diagrammatic end elevation of the shaker frame of the harvester.

FIG. 3 is an enlarged end elevation of the shaker frame taken from the opposite side as that depicted in FIG. 2.

FIG. 4 is an enlarged section taken generally on line 4—4 of FIG. 3.

FIG. 5 is a side elevation of the shaker frame shown in FIG. 3 with portions thereof being broken away to better illustrate the construction of the shaker drive mechanism and the striker bar configuration and which further includes a diagrammatic representation of the control system for the shaker drive mechanism.

FIG. 6 is a reduced fragmentary section taken on line 6—6 of FIG. 5.

DESCRIPTION OF THE PREFERRED EMBODIMENT

Referring now more particularly to FIG. 1, there is shown a grape harvester 10 that is adapted to continuously harvest grapes GP from grape vines GV. The limbs of the grape vines may be supported on trellis wires that are supported by stakes arranged between the individual grape vines (not shown). The harvester includes a vehicle 11 including a main frame 12 supported on wheels 14 and conventional drive means (not shown) for moving the main frame parallel to and over the row of grape vines. A suitable harvester vehicle of this type is shown in U.S. Pat. No. 3,396,521 to H. McKibben et al.

The harvester frame 12 includes several small beams 16 (FIGS. 3 and 5) that extend transversely at a level substantially above the grape vines at the front end of the frame and a larger tubular beam 18 that extends transversely at the same level at the rear end of the frame (FIGS. 1, 3, 5). A shaker assembly 22 is suspended from the beams 16 and 18 to support a shaker frame 32 which is mounted for pivotable movement about an axis A-A of rotation, as shown in FIG. 5, that extends longitudinally at the centerline of the harvester above the grape vines. Controls 26 (FIG. 1) are provided adjacent an operator's seat 24 for operating the drive mechanism of the shaker assembly 22 to cause it to selectively vibrate the trunks of the grape vines to dislodge grapes GP therefrom, as will be described hereinafter. The operator drives the harvester over the row of grape vines and activates the drive mechanism of the shaker assembly to cause the shaker frame 32 to rock laterally to vibrate several trunks of the vines at one time (together with any interposed stakes of a supporting trellis system). Such shaking dislodges grapes from the vines, and the loose grapes (FIG. 1) fall onto a collection system that includes a pair of opposed series of pivotable collector plates or baffles 27 and a pair of conveyors 28 that run longitudinally of the vehicle. For a further and more complete description of such baffles and conveyors, reference is made to the aforementioned U.S. Pat. Nos. to McKibben et al 3,396,521 and Rust 3,184,908.

Referring to FIGS. 3-6, the shaker assembly 22 will be seen to include a shaker frame suspension unit 30 that is rigidly attached to the transverse beams 16 and 18 to extend longitudinally at the centerline of the harvester vehicle and the shaker frame 32 which is pivotally suspended from the suspension unit 30. The suspension unit is constructed and mounted to the harvester frame 12 so that the axis of rotation of the shaker frame is horizontal and extends longitudinally at the centerline of the harvester frame above the grape vines GV. The shaker frame (FIG. 3) includes opposed frame sections 34 and 36 that extend longitudinally of the vehicle and that are pivotally interconnected at the axis A-A of rotation so as to be able to scissor relative to each other. The opposing frame sections 34, 36 are generally symmetrical about a vertical plane through the axis A-A, that is, through the centerline of the vehicle. Accordingly, although the following description shall be of the frame section 34, it will be understood that the description also generally applies to the opposing frame section 36 (with corresponding elements being similarly numbered except for the addition of a prime notation).

Frame section 34 will be seen, in FIGS. 3 and 5, to include a front arm 38, that is formed from flat metal plating and that is pivotally mounted at the front end of the suspension unit 30, and a rear arm 40 that is pivotally attached at the rear end of the suspension unit. The front and rear arms 38, 40 are of identical configurations. As shown in FIG. 1, each arm has an outwardly bowed configuration to provide a generally rectangular opening between the opposed pairs of arms through which the vines GV pass as the harvester is driven down a row of vines. Each arm includes an upper portion 42 that extends outwardly of the pivot axis A-A and an intermediate portion 44 that extends downwardly from the upper portion 42 in a spaced relationship from a vertical plane through the axis A-A (that is, from the plane of symmetry of the shaker assembly) to provide the aforementioned clearance for the vines as the harvester is moved down a row of vines. An inwardly extending portion 46 is formed at the lower end of each arm. The end portion 46 extends horizontally inwardly a substantial distance below the axis of rotation A-A toward the centerline of the harvester and thus toward the trunks of the vines to be shaken. It will be seen in FIG. 1 that the lower end portions 46 of the opposed frame sections are spaced closely above the collector plates 27 and conveyors 28.

Striker bars 48 and 48' are rigidly connected to the lower end portions 46, 46' of the opposing arms 34, 36. The bars 48, 48' have conventional ski shapes including front ends 50 that are bowed outwardly so that either may smoothly engage the vine trunks as the harvester is driven down a row. It is noted that each striker bar is connected to the lower end portion 46, 46' of the respective frame section to extend parallel to the axis of rotation A-A of the shaker frame and thus normal to the planes of the front and rear arms. As shown in FIG. 3 in dashed outline and in FIG. 5, plates 54 and 55 are connected between the front and rear arms 38, 40 of each frame section to reinforce the frame sections.

Referring to FIG. 5, the shaker frame suspension unit 30 will be seen to include a channel 72 that is rigidly connected to the transverse beams 16 and 18 by brackets 74 and 76, respectively, so as to extend longitudinally of the harvester. The brackets 74 received on the small beams 16 each include an upper member 78 that is notched to mate against the top of the beam and a lower member 79 that is notched to mate against the bottom of the beam. Each bracket 74 further includes a plate 80 which abuts against the upper surface of the channel 72. Threaded stud pins 81 are affixed to the plate to extend upwardly therefrom through the members 78 and 79, and nuts 82 are received on the pins to clamp the assembly to the beam 16. A bolting plate 83 is positioned directly below the plate 80 under the channel 72, and four bolts 84 are connected between the plates 80 and 83 to secure the channel 72 therebetween. The bracket 76 that is attached to the front beam 18 is a simple right angle bracket that also includes a pair of bolting plates which abut against the top and bottom walls of the channel 72 and four bolts which are connected between the bolting plates to secure the channel 72 therebetween.

The suspension unit 30 also includes a front pair of generally triangularly shaped bracket plates 56 and 57 for supporting a pivot pin 58 and a rear pair of similarly shaped bracket plates 64 and 65 for supporting another pivot pin 66. Apertures are formed through the bracket plates so that the pivot pins are coaxially aligned along the axis of rotation A-A at the centerline of the harvester vehicle. Annular bearings 60 (FIG. 4) are received on the pivot pins 58 and 66. The front arms 38 and 38' of the opposing frame sections 34 and 36 are pivotally mounted on the front bearing 60 (FIG. 4), and the opposing rear arms 40 and 40' are pivotally suspended in similar fashion on the bearing on the pivot pin 66. It will be seen in FIG. 4 that a ring 62 is welded to each arm 38, 38' to provide a wide surface for bearing against the bearing 60. The pivot pins 58, 66 are secured to the associated bracket plates 56, 57, 64, 65 by retainer rings 150 welded at the ends of the pins (FIG. 4) and affixed to the bracket plates.

Although the frame sections 34, 36 can scissor relative to each other about the axis A-A defined by the pivot pins 58 and 66, the frame sections are held, during harvesting, in a fixed relationship to each other by a pair of hydraulic cylinders 68 and 69. Such cylinders enable the frame sections to be opened or closed to set the distance between the striker bars 48 and 48' according to the size of the trunks of the vines and, furthermore, to enable the striker bars to be selectively separated to a distance greater than the diameter of the end posts (not illustrated) of the trellis system which supports the grape vines. Typically, for a 2 inch trunk size, the striker bars are positioned at a 4 inch spacing. The cylinders 68 and 69 are respectively connected between the front arms 38 and 38' and the rear arms 40 and 40' of the opposing frame sections. As depicted in FIG. 3, the cylinder 68 at the front of the shaker assembly 22 is connected between a bracket 70 on the frame section 34 and a bracket 71 on the frame section 36. These mounting brackets are secured to the upper portions 42, 42' of the respective arms 38, 38' above the axis of rotation A-A to thereby somewhat counterbalance the mass of the lower end of the shaker frame 32 and thus shift the center of gravity CG (FIG. 3) of the shaker frame and the elements mounted thereon toward the axis of rotation thereof. The cylinders 68, 69 are transversely connected in reverse order at the front and rear of the shaker frame in an effort to achieve an even weight distribution and thus prevent the shaker frame from listing to one side. During harvesting of the vines, the cylinders 68, 69 rigidly secure the frame sections 34 and 36 to each other so they may pivot about the axis A-A as an essentially rigid frame.

The shaker frame 32 is oscillated at a selected frequency and shaking force about the axis A-A by means of a drive mechanism, or vibration producing means, that is isolated from the harvester frame 12 and that is connected to the upper end of the shaker frame above the axis of rotation A-A so that it will not be exposed to contact with the harvested grapes or any possible grape juice. As shown in FIGS. 3 and 5-6, the drive mechanism includes a first pair of eccentric weight assemblies 85a and 85b that are affixed in longitudinally spaced relation to a first drive shaft 86 which, in turn, is rotatably mounted to the right frame section 34 between the front and rear arms 38 and 40 thereof. The drive mechanism further includes another pair of eccentric weight assemblies 87a and 87b that are affixed in the same longitudinally spaced relation to a second drive shaft 88 that is rotatably mounted to the opposing frame section 36 between the front and rear arms 38' and 40' thereof. The shafts 86 and 88 are equidistantly spaced from the axis of rotation A-A and are parallel to the axis of rotation, and the shafts lie in a transverse plane that is normal to the plane of symmetry of the shaker assembly and that is spaced above the axis of rotation. That is to say, the shafts 86, 88 are mounted to the upper portions 42, 42' of the opposing arms the same distance above the axis of rotation A-A and also the same distance outwardly of the plane of symmetry of the shaker frame. The shafts 86, 88 are elevated sufficiently above the axis of rotation to raise the center of gravity CG (FIG. 3) of the shaker frame and the elements supported thereby so that the center of gravity generally coincides with the axis of rotation. It will be seen in FIG. 3, however, that the center of gravity is slightly below the axis of rotation A-A. It will be apparent that the center of gravity could be made to coincide with the axis A-A by moving the eccentric weight assemblies upwardly from the axis of rotation A-A to counterbalance the mass of the lower portion of the shaker frame. Also, the same result could be achieved, for example, by reducing the masses of the striker bars. However, a slight lack of coincidence of the axis of rotation and the center of gravity of the shaker frame can be accepted without producing unacceptable vibrational force loads on the support bearings (FIG. 4), as shall be described hereinafter.

It will be seen from FIGS. 3 and 5 that the ends of shafts 86 and 88 are journaled in pillow block bearings 89 that are connected to the front and rear arms of the frame sections 34 and 36, respectively. Each of eccentric weight assemblies 85a and 85b and 87a and 87b is identical. Each eccentric weight assembly includes a flat, semi-cylindrical central weight 91 (FIG. 5) that is welded to the associated drive shaft and several removable weights 92 bolted to the central weight 91. More weights may be added to each eccentric weight assembly to increase the vibratory forces exerted on the shaker frame 32 at any particular speed of rotation of the drive shafts to thereby generally increase the amplitude of oscillation of the shaker frame.

The drive mechanism further includes means positively connected to the drive shafts 86 and 88 for rotating the eccentric weight assemblies 85, 87 on such shafts at the same speed, in the same direction, and always at a phase displacement of 180° to cause the shaker frame 32 to rock back and forth about the axis A-A during each complete revolution of the shafts. Thus, the shafts 86 and 88 extend rearwardly from frame sections 34 and 36, (FIG. 5) with the shaft 88 extending farther rearwardly than the shaft 86. Toothed pulleys 93 and 94 are connected to the ends of shafts 86 and 88, respectively. Timing belts 95 and 96 are positively engaged on the pulleys 93 and 94, respectively (see FIG. 6), and the belts 95 and 96 are, in turn, received on toothed pulleys 97 and 98 mounted in series upon a central drive shaft 99. The drive shaft 99 is driven by an hydraulic motor 100 that is mounted on a bracket 101 which depends from the rear end of the channel 72 (FIG. 5). As illustrated in FIGS. 5 and 6, the motor is mounted to the channel 72 so that the drive shaft 99 thereof is coincident with the axis of rotation A-A thereby permitting the shaker frame 32 to rock relative to the motor without damaging either belt 95 or 96. It will be appreciated that the portion of the drive unit comprising the two shafts 86, 88 and the eccentric weight assemblies 85, 87 thereon is isolated from the vehicle frame 12, the only connection being through the timing belts 95, 96. Thus, a non-positive vibratory drive is provided which is in direct contrast to the positive drive arrangements of the prior art wherein a fixed displacement is provided in the members which grip or impact against the trunk of the plant.

The frequency of oscillation of the shaker frame 32 can be directly controlled by varying the speed of the motor 100. Toward this end, the motor is fed with fluid through a line 102 (FIG. 5) under pressure by a pump 104, and an adjustable bypass valve 106 is connected in the line 102 to vary the motor speed by bypassing a selected proportion of the flow from the pump back to a reservoir 108. The control for the valve 106 is regulated by one of the controls 26 adjacent the driver seat 24 of the harvester. In the event that too many grapes are found to remain on the vines after shaking, the frequency may be readily increased or decreased by the driver until the optimal shaking frequency is achieved.

As previously stated, the eccentric weight carrying shafts 86 and 88 are positively connected by the timing belts 95 and 96 to the drive shaft 99 so the pairs of eccentric weight assemblies 85, 87 on the two shafts are always 180° out of phase with each other (FIGS. 1, 2, 3). Accordingly, when the motor 100 is energized, the phase relationship of the rotating eccentric weight assemblies is such that the centrifugal forces generated by the weights on the two shafts are always equal and are exerted in parallel but opposite directions. Such equal and opposite forces produce a couple that acts on the substantially rigid shaker frame to force it to alternately pivot back and forth in a lateral direction so as to vibrate the plants. Referring to the diagrammatic view of FIG. 2, the centrifugal forces exerted by the weight assemblies 85a, 85b on the frame section 34 will be seen to act downwardly in the direction of the arrow F1. At the same time, the eccentric weight assemblies 87a, 87b mounted to the opposite frame section 36 will be seen to be exerting an equal force upwardly in a parallel but opposite direction in the direction of the arrow F2 in FIG. 2. Due to the rigid connection of the frame sections by the cylinders 68, 69, a couple is induced by such opposite and parallel forces to thereby produce a reaction torque on the shaker frame that rocks the frame counterclockwise about the pivot axis A-A and produces a force on the wine trunk in the direction of the arrow F3.

Due to the symmetric positioning of the eccentric weights 85, 87 relative to the axis of rotation A-A, the continuous symmetry of the forces exerted by the weights, and the location of the center of gravity of the shaker assembly at approximately the axis of rotation A-A, substantially only torque forces are exerted on the bearings 60 and 61. That is to say, the forces exerted by the eccentric weights are balanced to produce only a couple that acts about the pivot bearing with but little or no forces being exerted by the weights laterally of the bearings as in known prior art trunk shakers. Due to the approximate alignment of the center of gravity and the single axis of rotation, the shaker frame 32 does not act as a pendulum so as to pull laterally at the bearings when the frame has rocked toward one side, for example, so as to cause the frame to pull in the direction of the force F3 when the shaker frame is rocking as shown in FIGS. 1 and 2. When the resistance provided by the trunk or trunks of the vines against the striker bars 48, 48' is relatively small, practically no radial vibrational forces will be transmitted to the bearings and thus into the frame 12 of the harvester through the rigidly mounted suspension unit 30. It is noted that the plants offer a minimum of resistance to bending when the striker bars impact the plants well above the ground and the amplitude of oscillation is restricted to 2 inches or so in each direction from the centered position.

Referring again to FIG. 2, it will be appreciated that as the eccentric weights 85b, 87b rotate from the FIG. 2 position to a position where force F1 is directed horizontally to the right and force F2 is directed horizontally to the left, no torque force will be exerted on the bearings at the pivot axis A-A. Then, as the eccentric weights continue to rotate, a clockwise torque will be exerted on the shaker frame to cause the striker bar 48' to impact the plant GV with a force opposite to the direction of force F3. It will thus be recognized that as the eccentric weights rotate through 360° from the FIG. 1 position first a counterclockwise torque is exerted on the shaker frame (for 180°) and then a clockwise torque is exerted on the shaker frame (for the remaining 180°).

It is noted that the suspension unit 30 may be resiliently mounted to the harvester frame in the event that the plants to be harvested are more resistant to being shaken than grape vines. Such a resilient mounting of the shaker assembly 22 to the frame 12 of the harvester will isolate lateral vibrations from being transmitted to the harvester frame.

It is again emphasized that the shaker frame 22 does not function as a pendulous mass; the center of gravity CG is approximately coincident with the axis of rotation A-A rather than being located substantially below the axis of rotation as is the case with a pendulum. The shaker frame can be considered to function as a flywheel that is alternately spun in opposite directions by the eccentric weight vibration producing mechanism. The shaker frame of the present invention does not rely upon the gravity of a pendulous mass or masses to slow the angular velocities of the striker bars so as to permit a smooth reversal of their arcuate movement and thereby minimize vibrations in the harvester frame. In the present shaker frame 32, the parallel but opposite forces induced by the eccentric weight assemblies 85, 87 alternately reverse directions to counteract the angular momentum of the shaker frame to deaccelerate arcuate movement in one direction and thereafter rapidly accelerate the shaker frame in the opposite direction.

It is further noted that, as shown in FIG. 2, there may be a relatively slight lack of coincidence between the axis of rotation A—A and the center of gravity CG without an undue amount of force load being transmitted laterally of the bearings 60, 61 to be absorbed thereby. For example, when the center of gravity extends through the lower portion of the pivot pins 58 and 66 as shown, no appreciable vibrations were generated in the harvester frame when the motor was operated to rotate the eccentric weights 85, 87 at about 450 rpm.

Since the center of gravity CG is slightly below the axis of rotation A—A, the shaker assembly will come to rest with the eccentric weights in an orientation as shown in FIG. 1 (or 180° therefrom).

It will be understood that the grapes are snapped loose from the stems in proportion to the relative instantaneous velocities of the grapes and the stems to which such grapes are connected. This shaking effect is conventional in trunk type shakers, and maximum forces tending to separate the grapes will occur when the difference between the instantaneous grape and stem velocities is greatest which will typically occur at the ends of the shaking stroke where the grapes and stems will very briefly be moving in opposite directions.

The tenacity of the connections of the grapes to their stems depends on their ripeness and on the grape variety. Prior art harvesters have been provided with means for changing the frequency and amplitude of vibration of the shaker elements to achieve enough acceleration to achieve maximum relative acceleration and thus grape removal. The present shaker assembly permits both of these variables to be very conveniently adjusted. The masses of the eccentric weight assemblies 85a, 85b and 87a, 87b is readily changed by removing or adding the weights 92. The speed of rotation of the eccentric weights can be adjusted during harvesting by increasing or decreasing the speed of the motor 100 by means of the bypass valve 106 and the control 26 therefore that is adjacent the vehicle operator.

In grape harvesting, care must be taken to minimize damage to the trunks of the vines and the stakes (not shown) of the trellis system which supports the grape vines. Generally, the trunks and stakes are more apt to be damaged when the amount of lateral displacement thereof is greater. Thus, it is generally more desirable to increase the frequency of the shaking action to enhance group removal than it is to increase the displacement. The present shaker assembly is believed to be capable of operating at a much higher frequency than was heretofore possible to thereby maximize grape removal while minimizing any trunk damage.

In summary, the harvester 10 has many advantages over the known prior art harvesters adapted for harvesting plants such as grapes that are grown in rows. The bearings, pivot points and the shaker drive mechanism of the shaker assembly 22 of the harvester are elevated above the plants so that the fruits dislodged from the plants, and any juice expressed therefrom, do not fall or drain thereon. This of course eliminates the need to protect or seal such pivot points from such exposure, but more importantly, this feature eliminates any concern about bearing failures caused by the corrosive action of the fruit juices. In this connection, it will be appreciated that the shaker drive mechanism for the harvester of the present invention does not include any vertical drive shafts but rather has only horizontal shafts that do not induce juice to flow toward the lower end thereof.

The shaker assembly 22 of the present invention also has a much simpler construction than those prior art harvesters that are adapted to impact the trunks of plants. The shaker assembly has only one pivot axis A—A and two bearings 60 rather than the great number of pivot points and bearings as with the prior art trunk shakers. The advantages of such simplified construction will be appreciated to be reduced manufacturing costs, a much simplified maintenance program for the harvester, and greatly increased reliability. Also, the moving parts of the shaker assembly 22 are easily accessible from the top of the shaker assembly.

Another reason for the greatly increased reliability of the shaker assembly 22 is that the bearings 60 at the pivot axis of the shaker assembly are subjected only to minor radial forces. The crank drive mechanisms of the prior art devices, as previously stated, can induce substantial transaxial forces on the bearings of the four bar linkages that support the striker bars.

Another important advantage of the present invention is that the forces induced by the dual shaft, eccentric weight drive mechanism on the shaker assembly 22 are so balanced and the mass of the shaker assembly is so distributed about the axis of rotation A—A that very little vibration is transmitted through the bearings 60 into the suspension unit 30 and therefrom into the support frame 12 of the harvester. Assuming that the resistance to bending of the trunk of the plant struck by the striker bars 48, 48' is relatively small, the forces induced by the shaker assembly into the suspension unit are not appreciable. In the event that the resistance of the plant trunk or trunks against the striker bars is very great, a relatively simple modification providing a resilient mounting of the suspension unit 30 to the frame of the harvester can be provided to eliminate vibrations from being fed into the harvester frame as such trunks are struck.

It is further noted that the drive mechanism, or vibration producing means, for the shaker frame 32 is isolated from the harvester frame 12, even though the motor 100 is directly mounted to the suspension unit 30. The feedback through the belts 95 and 96 to the motor 100 and therefrom to the suspension unit 30 is limited to a relatively insignificant harmonic torque component. Such torque component is very small compared to the moment of inertia of the shaker frame about its axis of rotation A—A so that any vibrational forces induced by the feedback to the motor are negligible.

Another important advantage of the present invention relates to the synchronization of movement of the parallel striker bars 48 and 48'. In certain prior art shaker assemblies, the synchronization of the crank arm drive units is accomplished by two right angle drive assemblies. In the event that such synchronization is inaccurate, the striker bars may impact the plants in opposite directions at the same time to thereby cause damage to the plants. In the present invention, the striker bars 48, 48' are rigidly mounted to the frame sections 34 and 36 and the frame sections are held by the cylinders 68 and 69 in a fixed relationship to each other to comprise a substantially rigid shaker frame 32. In this manner, the eccentric weight drive mechanism can cause only one of the striker bars to impact the plant trunks at a time. That is to say, the present invention provides perfect synchronization of movement of the parallel striker bars.

Another important advantage of the present invention is that the shaker assembly 22 is capable of a wider range of frequency and displacement combinations than is believed to be possible with the prior art striker bar type of harvesters. The frequency of oscillation can be readily changed by the control of the hydraulic motor 100, and the displacement can be readily changed by removing or adding weights 92 to the eccentric weight assemblies 85a, 85b and 87a, 87b.

Another important advantage is that since the eccentric weights are always driven in the same direction and at the same speed, the associated bearings 89 are not subject to load reversals and the consequential bearing stresses. By so eliminating load reversal on the bearings, it is believed that the shaker assembly can generate a higher frequency shaking action than has been heretofore possible. Also, the elimination of load reversal on the bearings provides for much quieter operation.

Yet another important advantage is that the present shaker assembly 22 seems to cause no significant stake or vine damage in the event that the operator improperly steers the harvester so that the pivot axis A—A of the shaker assembly becomes transversely displaced from the location centered directly above the vines or stakes as shown in FIG. 1. In such event, the shaker frame will readily tilt away from the engaged stakes or vines because the center of gravity CG of the shaker frame and the elements attached thereto is approximately coincident with the pivot axis. In such tilted orientation the shaker frame will exert essentially the same magnitude of shaking forces on the plants as when it is properly centered over the plants.

Although the best mode contemplated for carrying out the present invention has been herein shown and described, it will be apparent that modification and variation may be made without departing from what is regarded to be the subject matter of the invention.

What is claimed is:

1. In a harvesting apparatus that includes a vehicle movable to a position adjacent the plant to be harvested, said vehicle including a support frame, a shaker assembly mounted to said vehicle support frame for shaking the trunk of a plant to dislodge crops therefrom comprising: a shaker frame, means connected to said support frame for mounting said shaker frame for pivoting about a single axis that is overhead the plant to be shaken, said shaker frame including first and second frame sections that extend downwardly of said axis of rotation in substantially fixed relation to each other and that terminate in outer ends, striker members connected to said outer ends in opposing relation, and drive means separate and distinct from said striker members and being connected thereto only through said shaker frame for oscillating said shaker frame as a single unit about said axis to cause said striker members to alternately impact the opposite sides of the trunk of said plant, said drive means being connected to said shaker frame at a height situated generally above said plant.

2. The apparatus according to claim 1 wherein said first and second frame sections are adjustably scissorable relative to each other, and said shaker frame includes means for adjustably securing said first and second frame sections so that said striker members may be positioned at various fixed distances from each other.

3. A harvesting apparatus of the type adapted to shake the trunks of plants comprising: a vehicle movable to a position adjacent a plant to be harvested; said vehicle including a support frame, a shaker assembly mounted to said vehicle support frame for vibrating the trunk of the plant; said shaker assembly including a shaker frame and means for pivotally mounting said shaker frame to said vehicle frame to rotate about a single horizontal axis that overlies the plant; said shaker frame including a frame section that extends generally downwardly of said axis, a striker member connected to said frame section at the lower end thereof and adapted to strike the trunk of said plant, and a pair of eccentric weight means rotatably mounted to said shaker frame at positions that are equidistantly spaced from said axis; said eccentric weight means being separate and distinct from said striker member and being connected thereto only through said shaker frame; and means for simultaneously rotating said first and second eccentric weight means at a selected speed and with a predetermined phase relationship to each other to cause the shaker frame to rock laterally about said axis to thereby cause the striker member to repeatedly strike the trunk of the plant at a selected frequency.

4. A harvesting apparatus according to claim 3 wherein said shaker frame has a predetermined center of gravity that is approximately coincident with said axis of rotation.

5. An apparatus for harvesting row crops such as grape vines including a vehicle, said vehicle including a support frame that is elevated above the plants to be harvested so that the harvester vehicle may be driven over the row of plants to be harvested, and a shaker frame pivotally suspended from said vehicle frame for vibrating the trunks of the plants, means for pivotally mounting said shaker frame to said vehicle support frame for pivoting about a single axis that extends in the direction of movement of the vehicle, said shaker frame including opposing elongate arm poritions that extend downwardly of said axis, each arm portion terminating in an end that is distal from said axis, a pair of elongate striker members that are transversely spaced and that are respectively connected to said distal ends of said arm portions, oscillatory drive means mounted on said shaker frame and isolated from said vehicle support frame for causing said shaker frame to rock laterally from side to side to cause said striker members to alternately impact the trunks of the plants, said oscillatory drive means being separate and distinct from said striker members and being connected to said striker members only through said shaker frame arm portions, said shaker frame and drive means having a center of gravity that is relatively close to said axis of rotation.

6. The apparatus according to claim 5 wherein said opposing arm portions are adjustably scissorable relative to each other, and said shaker frame including means for adjustably rigidly securing said arm portions to each other during harvesting.

7. Apparatus according to claim 5 wherein said drive means includes a pair of shafts, means for rotatably connecting said shafts to said shaker frame in parallel relation to said axis of rotation and at equal transverse distances from said axis of rotation, eccentric weight means mounted upon said shafts, and means positively connected to said shafts for rotating said shafts to cause said eccentric weight means on said shafts to rotate at a predetermined phase relationship to each other to cause said shaker frame to rock about said axis of rotation.

8. An apparatus for harvesting crops from plants comprising: a vehicle, said vehicle including a support frame that is elevated above a plant to be harvested, a generally rigid shaker frame, means for pivotally attaching said shaker frame to said vehicle frame to enable the shaker frame to pivot back and forth about a single axis that extends longitudinally of the vehicle above the plant to be harvested, striker members attached at the lowermost end of said shaker frame in a transversely spaced relation and at a height adapted to engage opposite sides of the plant, said shaker frame having a configuration between said striker members and said axis of rotation to permit the plant to pass therethrough as the vehicle is driven over said plant, and oscillatory drive means mounted on said shaker frame and substantially isolated from said support frame for rocking the shaker frame about said axis to cause the striker members to alternately impact the plant to thereby shake said plant and dislodge crops from said plant, said oscillatory drive means being separate and distinct from said striker members and being connected to said striker members only through said shaker frame.

9. The harvesting apparatus according to claim 8 wherein said drive means is located entirely above the plant to be shaken thereby protecting said drive means from contact with the crops being harvested.

10. The harvesting apparatus according to claim 8 wherein said shaker frame includes a pair of frame sections that are adjustably scissorable relative to each other, said striker members being respectively attached to the lower ends of said frame sections, and means for adjustably securing said frame sections so that said striker members are adjustably maintained at a selected distance from each other.

11. The harvesting apparatus according to claim 8 wherein said drive means includes a pair of eccentric weight means that are each rotatably mounted to said shaker frame for rotation about respective axes that are equidistant from and parallel to said axis of rotation of the shaker frame, and means for driving said eccentric weight means at the same speed and at a predetermined fixed phase relationship relative to each other to cause said shaker frame to pivot back and forth as said eccentric weight means are driven through complete revolutions.

12. The harvesting apparatus according to claim 8 wherein said shaker frame together with said drive means has a center of gravity that is approximately coincident with said axis of rotation.

13. The harvesting apparatus according to claim 12 wherein said shaker frame includes a pair of frame sections, said striker members being respectively mounted to frame sections, means for scissorably mounting said frame sections relative to each other, and means for adjustably fixing the relative positions of said frame sections so that said striker members at the ends thereof are at a predetermined fixed spacing from each other.

14. The harvesting apparatus according to claim 13 wherein said drive means comprises a pair of eccentric weight means rotatably mounted to each of said frame sections for rotation about axes that are parallel to and equidistant from said axis of rotation of said shaker frame; and means positively connected to said pair of eccentric weight means for driving the same at the selected speed and at a predetermined phase relation to each other.

15. The harvesting apparatus according to claim 14 wherein said frame sections are adjustably scissorable about a single axis aligned with said axis of rotation of the shaker frame, said means for driving said pair of eccentric weight means including a drive shaft mounted coaxially with said axis of rotation, and endless belt means connecting said drive shaft and each of said eccentric weight means.

16. In a vibratory plant harvester that includes a harvester vehicle having a support frame, a shaker assembly attached to said support frame for shaking the trunk of a plant comprising: a shaker frame, means for mounting said shaker frame to said support frame for rotation about a single axis, said shaker frame including two frame sections that extend outwardly from said axis to a position on either side of the trunk of the plant to be shaken, striker members attached to said frame sections in opposed relation for alternately striking the sides of the trunk, oscillatory drive means isolated from said support frame for pivoting said shaker frame back and forth about said axis to cause said striker members to alternately strike said trunk, said oscillatory drive means being separate and distinct from said striker members and being connected thereto only through said frame sections, said oscillatory drive means including at least two eccentric weight means rotatably mounted to said frame for rotation about axes that are equidistant from and parallel to said axis of rotation of the shaker frame, means positively connected to said eccentric weight means for driving both of said weight means at the same speed and at a predetermined phase relation to each other to cause said shaker frame to alternately rock back and forth dependent on the rotative positions of said eccentric weight means, said two eccentric weight means being mounted to said shaker frame on the opposite sides of said axis of rotation from said striker members such that the center of gravity of said shaker frame and the elements of said drive means directly attached thereto is relatively close to said axis of rotation.

17. The apparatus according to claim 16 wherein said means for pivotally mounting said shaker frame to said support frame is adapted to permit said shaker frame to rotate about an axis of rotation that is horizontal and that is located above the plant to be harvested, said frame sections being configured to surround the plant to be shaken, and the striker members being elongate and parallel and spaced from the trunk of the plant to be shaken, whereby said plant may be harvested while the harvester is moving.

18. An apparatus for harvesting crops from plants comprising a vehicle of the type having a generally inverted U-shaped frame structure adapted to surround the plant, a shaker frame member pivotally mounted to said vehicle frame structure about an axis extending generally parallel to the path of travel of said vehicle, a striker member secured to the lower end of said shaker frame member and adapted to engage the lower portion of said plant, and vibration producing means comprising a rotating eccentric weight secured to said shaker frame member and isolated from said vehicle frame structure for causing the striker member to be periodically pivoted about said axis into impacting engagement with said plant to shake the crop therefrom said rotating eccentric weight being separate and distinct from said striker member and being connected thereto only through said shaker frame member.

19. An apparatus according to claim 18 wherein said shaker frame member is of a generally inverted U-shape and wherein two striker members are secured to the lower end thereof for alternately impacting said plant on opposite sides thereof.

20. An apparatus according to claim 19 including conveying means mounted on said vehicle below said shaker frame member for receiving and conveying the crop shaken from said plant.

21. An apparatus according to claim 19 wherein said vibration producing means comprises a pair of rotating eccentric weights and means for driving said eccentric weights at a common speed and at a predetermined phase relationship.

22. An apparatus for harvesting crops from plants comprising a vehicle having a frame structure, a shaker frame member pivotally mounted to said vehicle frame structure about a single axis extending generally parallel to the path of travel of the vehicle, a striker member secured to the lower end of said shaker frame member and adapted to engage the lower portion of said plant, and non-positive drive means attached to said shaker frame member for movement therewith for causing the striker member to be periodically pivoted about said axis into impacting engagement with said plant to shake the crop therefrom, said non-positive drive means being separate and distinct from said striker member and being connected thereto only through said shaker frame member.

23. An apparatus according to claim 22 wherein said shaker frame member is of a generally inverted U-shape and wherein two striker members are secured to the lower end thereof for alternately impacting said plant on opposite sides thereof.

* * * * *